No. 747,228.

Patented December 15, 1903.

UNITED STATES PATENT OFFICE.

CLAUDE A. O. ROSELL, OF NEW YORK, N. Y., ASSIGNOR TO COMPOSITE STONE AND BRICK COMPANY, A CORPORATION OF DELAWARE.

MAKING COMPOSITE STONE.

SPECIFICATION forming part of Letters Patent No. 747,228, dated December 15, 1903.

Application filed January 28, 1903. Serial No. 140,836. (No specimens.)

*To all whom it may concern:*

Be it known that I, CLAUDE A. O. ROSELL, a citizen of the United States, residing at New York, State of New York, have invented a new and useful Improvement in Making Composite Stone, of which the following is a specification.

This invention relates to the manufacture of composite stone consisting, essentially, of sand and lime and in which the binding effect of the lime is supplemented by the use of an alkaline compound. The particular alkaline compound I use is sodium hydrate or caustic soda.

In making composite stone according to this process I proceed as follows: To a solution of caustic soda quicklime is added until a dry mixture of sodium hydrate and calcium hydrate is produced. This mixture is mixed with any available form of silica or material in which silica preponderates, such as ordinary sand in a dry state. Sufficient moisture is added to make the composition capable of being shaped by mechanical pressure in a mold, the moisture required for the purpose being only very slight. After the composition has been thus prepared it is formed into articles of desired shape, and these are indurated in any preferred manner, no novelty being claimed for this feature of the process.

The percentage of lime and soda used is as follows: from three to six per cent. of slaked lime and one-fifth to one per cent. of caustic soda counted as dry sodium hydrate. These proportions are by weight and are an illustration, not a limitation. The amount of water used in the caustic-soda solution is varied with the amount of quicklime that is to be slaked therein.

In place of applying all the lime and all the caustic soda as a dry mixture of lime and caustic soda only part of the quicklime to be used may be added to the caustic-soda solution to form a dry mixture of lime and caustic soda, the other portion of the quicklime being slaked separately with water or steam in the usual way, and the sand, slaked lime, and a dry mixture of lime and caustic soda may then be mixed, after which the operation will proceed exactly as before described.

This process is more particularly adapted for the making of indurated sand bricks of very superior quality.

In place of applying the caustic soda in the form of a dry mixture of lime and caustic soda it may also be used in the form of a solution, in which case the main ingredients—silica and slaked lime—are moistened with the caustic-soda solution previous to molding. Again, in place of using the caustic soda in the body of the composition it may be applied as a solution to the surface of the molded articles, in which case the articles may preferably first be partly indurated, after which the caustic-soda solution is applied to their surface and the induration may then be completed. The effect of the use of the caustic-soda solution on the surface of the molded articles made of sand and lime and which have a more or less friable surface is a surface-hardening, which removes or diminishes the objection of friability. It is evident that the caustic-soda solution may also be applied to a partly-indurated composition made of sand, caustic soda, and slaked lime and in general to any partly-indurated articles of which an increase of the surface hardness may be desired. Likewise the caustic soda may also be applied dissolved in milk of lime to any partly-indurated articles to increase the surface hardness.

The simultaneous use of caustic soda and lime has the advantage that the soda and the lime readily form an insoluble calcium-sodium silicate, which is the result aimed at whenever an alkaline compound of any kind is used with lime and sand.

The partial induration referred to need only be carried so far that the articles treated do not disintegrate when immersed or soaked in the caustic-soda solution with or without the lime.

What I claim as new is—

1. In the art of making artificial stone, the improvement which consists in mixing sand, slaked lime and caustic soda, forming the mixture into articles of desired shape, and then indurating the same.

2. In the art of making artificial stone, the improvement which consists in mixing sand, and a dry mixture of lime and caustic soda, forming the mixture into articles of desired shape and then indurating the same.

3. In the art of making artificial stone, the improvement which consists in mixing sand, slaked lime and a dry mixture of lime and caustic soda, forming the mixture into articles of desired shape, and then indurating the same.

4. In the art of making artificial stone, the improvement which consists in mixing sand with a suitable binding agent, forming the mixture into articles of desired shape, partly indurating said articles, then applying to them a solution of caustic soda, and then completing the induration.

5. In the art of making artificial stone, the improvement which consists in mixing sand, slaked lime and caustic soda, forming the mixture into articles of desired shape, partly indurating the same, then applying to them a solution of caustic soda, and then completing the induration.

6. In the art of making artificial stone, the improvement which consists in mixing the constituent ingredients, forming the mixture into articles of desired shape, partly indurating the articles, applying to them a solution of caustic soda and then completing the induration.

7. In the art of making artificial stone, the improvement which consists in mixing the constituent ingredients, forming the mixture into articles of desired shape, partly indurating the articles, applying to them milk of lime containing caustic soda in solution and then completing the induration.

In testimony whereof I have signed my name to this specification, in the presence of two subscribing witnesses, this 26th day of January, 1903.

CLAUDE A. O. ROSELL.

Witnesses:
 LYNN S. LEET,
 B. F. KEINARD.